United States Patent [19]

Stünkel

[11] 4,139,420
[45] Feb. 13, 1979

[54] LIQUID WASTE DISPOSAL SYSTEM

[75] Inventor: Helmut Stünkel, Erlangen, Fed. Rep. of Germany

[73] Assignee: Kraftwerk Union Aktiengesellschaft, Mülheim an der Ruhr, Fed. Rep. of Germany

[21] Appl. No.: 770,378

[22] Filed: Feb. 22, 1977

[30] Foreign Application Priority Data

Mar. 24, 1976 [DE] Fed. Rep. of Germany ....... 2612510

[51] Int. Cl.² .............................................. B01D 3/14
[52] U.S. Cl. ........................................ 203/37; 203/3; 203/10; 203/98; 203/DIG. 19; 252/301.1 W
[58] Field of Search .................. 252/301.1 W; 203/10, 203/11, 33, 36, 37, 98, 99, DIG. 19, 90, 1, 3; 202/158, 153, DIG. 18

[56] References Cited

U.S. PATENT DOCUMENTS

| | | | |
|---|---|---|---|
| 3,330,741 | 7/1967 | Theilig et al. | 203/37 |
| 3,480,516 | 11/1969 | Goeldner | 203/10 |
| 3,531,376 | 9/1970 | Minoda et al. | 203/37 |
| 3,547,783 | 12/1970 | Yamaguchi et al. | 203/37 |
| 3,672,961 | 6/1972 | Nixon | 203/37 |
| 3,873,362 | 3/1975 | Mihram et al. | 252/301.1 W |
| 3,933,576 | 1/1976 | Rushton | 252/301.1 W |
| 4,008,131 | 2/1977 | Price | 203/98 |
| 4,040,973 | 8/1977 | Szivos | 203/49 |

*Primary Examiner*—Wilbur L. Bascomb, Jr.
*Attorney, Agent, or Firm*—Herbert L. Lerner

[57] ABSTRACT

Treatment of liquid waste contaminated with volatile radioactive substances under both acid and alkaline conditions in a single unit consisting of a still with connecting superposed column of spaced bubble-cap type plates. The pH of the liquid in the still is different from the pH of liquid reflux in an intermediate group of plates in the column facilitating scrubbing out of the volatile radioactive substances. An intermediate loop for circulating liquid from the bottom plate of the intermediate group to the top plate of the intermediate group at controlled pH is provided for this purpose.

14 Claims, 1 Drawing Figure

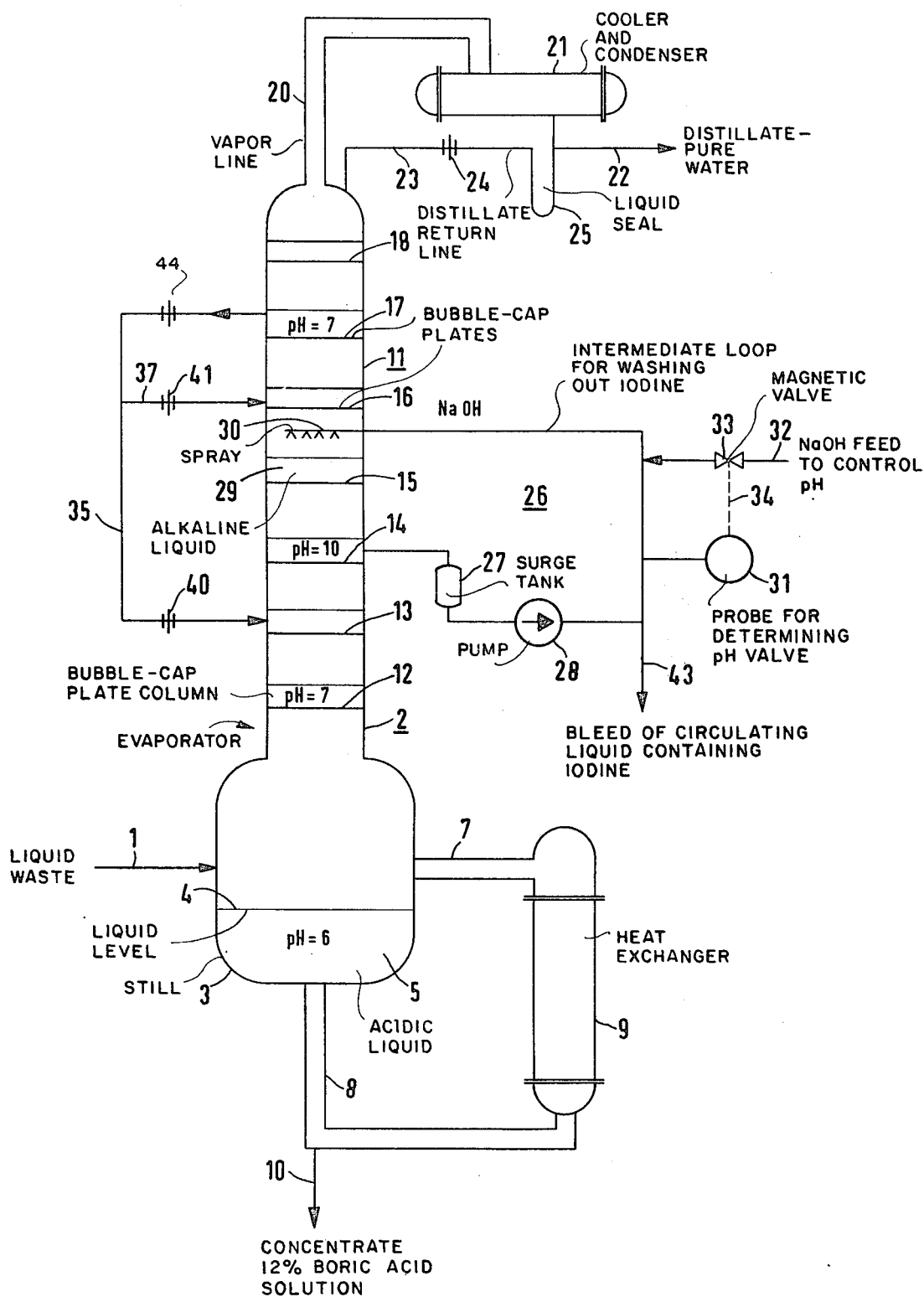

LIQUID WASTE DISPOSAL SYSTEM

BACKGROUND OF THE INVENTION

1. Field of the Invention

This invention relates to liquid waste disposal and more particularly refers to a new and improved method and apparatus for treating liquid waste contaminated with volatile radioactive substances.

2. Description of the Prior Art

In nuclear power stations water is used for many purposes such as cooling water, boiler water and turbine steam. Some of the waste water collected from these sources contain impurities, particularly volatile radioactive substances which create a problem. The usual practice was to evaporate the liquid in a still fitted with a bubble-cap column. It was found, however, that purification could not be adequately accomplished even if the waste water were acidified because of the carryover of volatile contaminants. Resort was had to subjecting the partially purified waste water to another treatment in another still equipped with a bubble-cap column but in the second operation employing a liquid of different pH, e.g. alkaline liquid. While this procedure satisfactorily purified the waste water, it does involve two operations with two stills and corresponding bubble-cap columns, which equipment is expensive, in view of the corrosion resistant material required, costing $40,000.00 and up per unit.

SUMMARY OF THE INVENTION

An object of the present invention is to provide an efficient method and apparatus for treating contaminated aqueous liquid containing volatile radioactive substances.

With the foregoing and other objects in view, there is provided in accordance with the invention a method for treating contaminated aqueous liquid to remove volatile radioactive substances contained therein, which includes maintaining a body of liquid containing contaminants in a still zone, heating the liquid to generate vapors and volatilize radioactive substances, passing the generated vapors and volatilized radioactive substances upwardly in a column containing a plurality of spaced plates in intimate contact with reflux condensate on the plates resulting from the partial condensation of the vapors in the column, withdrawing liquid from the lower plate of an intermediate group of at least two successive plates and recirculating the liquid to the upper plate of the intermediate group, maintaining the recirculating liquid at a pH different from the body of liquid in the still zone to aid in retaining volatile radioactive substances passing up through the intermediate group of plates in contact with the liquid of a different pH on the plates, and releasing purified vapor free of volatile radioactive substances from the top of the column.

In accordance with the invention, reflux condensate on a plate above the intermediate group of plates is withdrawn from the column and introduced into the column at a point below the intermediate group of plates.

A portion of the withdrawn reflux condensate in an amount of less than 10% is diverted and directed as reflux to the intermediate group of plates.

As a further feature, a small amount of less than about 10% is bled from the recirculating liquid to prevent build-up of volatile radioactive substances in the recirculating liquid and in the column.

There is provided in accordance with the invention, apparatus for treating contaminated aqueous liquid to remove volatile radioactive substances contained therein which, includes a still for containing a body of contaminated liquid, means for heating the liquid and generating vapors and volatilizing the radioactive substances, a vertical column disposed above and in open communication with the top of the still, a plurality of spaced plates in the column and passageways in the plates through which vapor passes up in intimate contact with liquid on the plate, an intermediate group of at least two successive plates in the column, conduit means for withdrawing liquid from the lower plate of the intermediate group, pump and conduit means for recirculating the withdrawn liquid to the upper plate of the intermediate group, inlet means for introducing a substance to make the pH of the recirculating liquid different from the body of liquid in the still, conduit means connected to a plate above the intermediate group of plates for the withdrawal of liquid reflux on the plate, and conduit means for passing the withdrawn liquid reflux from the plate above into the column at a point below the intermediate group of plates, an opening at the top of the column for the release of vapor, a cooler and condenser through which the vapors pass and are condensed, and a return line to the top of the column for the return of a portion of the condensed vapors.

In accordance with the invention, there is provided means for determining the pH of the recirculating liquid, and control means connected with said means for regulating the introduction of the substance to maintain the pH in the recirculating liquid.

BRIEF DESCRIPTION OF THE DRAWING

Other features which are considered as characteristic for the invention are set forth in the appended claims.

Although the invention is illustrated and described herein as embodied in liquid waste disposal system, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which is diagrammatically illustrated a still and superposed bubble-cap plate column with intermediate loop to an intermediate group of plates for treating waste liquid in accordance with the present invention.

DETAILED DESCRIPTION OF THE INVENTION

In the evaporator consisting of still-bubble-cap plate column, the still contains one of the washing fluids, i.e. the liquid therein is in contact with the impurities. The other washing fluid is the liquid flowing through conduits by means of a pump to form a loop which connects with at least two plates in an intermediate part of the column. The washing or contacting of the impurities is therefore performed with two washing fluids completely different with respect to their pH-values, in a single evaporator, so that a second evaporator is not needed. This makes it possible to meet stringent radiation protection requirements with substantially reduced operating costs and capital inventment.

The plates of the other washing fluid are advantageously arranged in the central region of a column and may be bridged by a return line. In this arrangement, the vapors passing up through the column are scrubbed with the washing fluid present on the bubble-cap plates of the column. Any traces of the other washing fluid that may have been carried along with the vapors are scrubbed out with reflux at the top of the column and returned to the still where they are neutralized. The plates belonging to the other washing fluid on the intermediate plates can be operated with one-tenth or less of the reflux quantity of the column.

The loop of the other washing fluid is advantageously equipped with a spraying device inside the column and a control device for regulating the pH value. The control device has a probe of conventional design for determining the given pH value and a feeding device for the acid or alkaline component, which is admitted by opening a valve. The component can be fed-in at a predetermined pressure which, for example, may be increased or decreased by elevating or lowering its liquid level.

The pH values of the two washing fluids should desirably differ from each other by at least the value 2, and preferably the operation is conducted with substantially larger differences of the order of 4 to 6 or more of the pH values, as will be later illustrated.

The accompanying drawing describes an evaporator constructed in accordance with the invention in connection with the liquid waste disposal system of a nuclear power station. However, the invention is of interest also for other applications, for example, for removing radiation components from the liquids which are produced in fuel processing or in nuclear engineering laboratories.

Referring to the drawing, the liquid waste to be treated, e.g., the boric acid-containing or pre-purified cooling water of a pressurized-water power reactor, which contains radioactive substances such as iodine and antimony, enters the evaporator, designated generally by the numeral 2, via a pipeline 1. It flows into the lower part or still 3 of evaporator 2, where it forms a body of liquid 5 with a liquid level 4.

Evaporators for concentrating a liquid are known and often consist of a lower portion or vessel designated still into which the liquid to be concentrated is fed and from which generated vapors are evolved. These vapors are passed upwardly to a column in open communication with the still and the vapors rise upwardly countercurrent to downwardly flowing reflux condensate. Vapors from the top of the column are cooled and condensed, and collected as distillate product. Although various types of packing are employed in the column, the present invention is directed to a column which has spaced plates, exemplified by the bubble-cap type plates, on which liquid collects and through which the rising vapors pass upwardly in intimate contact therewith. The well known bubble-cap plate tower is preferred.

The waste water in this instance serves to function as one of the washing fluids. The washing fluid 5 is, for example, slightly acidic with a pH value of 6.

Beneath the still 3 is connected a line 8, which leads to a heat exchanger 9. In the latter, the liquid waste is heated by indirect heat exchange with a hotter fluid such as superheated steam causing generation of vapors and volatilization of volatile impurities such as volatile radioactive substances. The heated liquid containing vapor in the form of steam and volatilized impurities returns to still 3 via a line 7 at a point above the liquid level 4. The concentrate, for example, a 12% boric acid solution produced in still 3, may be discharged through line 8 connected to line 10.

Disposed above the still 3 and in open communication therewith is a column 11 with a total of seven bubble-cap or washing plates 12, 13, 14, 15, 16, 17 and 18, through which vapors and volatilized impurities stemming from the still 3 rise upward into column 11 through the plates and in contact with the liquid on the plates. A vapor line 20 extends from the column 11 to a cooler 21 for the cooling and condensation of the vapor. Boric acid-free condensate, i.e., pure water is discharged through a distillate line 22 connected to the bottom side of the cooler 21. A branch line 23 with a valve 24 is connected to the line 22 via a liquid seal 25. A small part of the distillate, say, 10%, is conducted via this branch line 23 directly into the column 11 as reflux. This reflux liquid is neutral, i.e., has a pH value of 7.

While with the slightly acidic washing fluid, antimony is washed out or held back in the still 3, an intermediate loop 26, which includes the plates 14 and 15 of the column 11, is provided for washing-out, for example, iodine. A buffer or surge tank 27 ahead of the input side of a pump 28 is inserted into the loop 26 to insure constant steady feed to pump 28. Both tank 27 and pump 28 are disposed outside the column 11. The pump 28 pumps a second washing fluid 29, which is adjusted basic by sodium hydroxide, to a spraying device 30 above the plate 15.

The pH-value of the washing fluid of the intermediate loop 26 is determined by means of a conventional probe 31. The washing fluid has a desired value of 10, which can be controlled by adding sodium hydroxide (NaOH) from a line 32. For this purpose, a magnetic valve 33 is opened in dependence on the probe 31, as is indicated by the functional line 34, so that the second washing fluid, which is pumped by the pump 28 into the spraying device 30, is enriched with sodium hydroxide.

The plates 14 and 15 of the column 11 are bridged by a return line 35, which starts from the liquid-filled part above the plate 17 flowing through valve 44 in line 35. Of the total reflux quantity, a portion of, say, 5% is branched off by means of a line 37 and fed to the plate 16. This portion is then brought from a pH-value of 7 to the basic pH-value 10 by means of the intermediate loop 26, so that there the iodine can be washed out. A portion of the liquid in the intermediate loop and containing the washed out iodine is discharged through line 43. The pH-values differ therefore by at least 3.

The remaining 95% of the reflux quantity gets to the plate 13 via an adjustable valve 40. An adjustable valve 41 is provided in the line 37 and by this means the percentage of the amount of reflux fed to the loop 26 may be determined. If required, the valve 41 can also be included in the control mechanism of the intermediate loop 26 in order to keep the desired basic pH value constant.

There are claimed:

1. Method for treating radioactive contaminated aqueous liquid to remove volatile radioactive substances contained therein, which comprises maintaining a body of liquid containing contaminants in a still zone at a pH below 7, heating said liquid to generate vapors and volatilize radioactive substances, passing said generated vapors and volatilized radioactive substances upwardly in a column containing a plurality of spaced plates in intimate contact with reflux condensate on the plates resulting from the partial condensation of the vapors in the column, withdrawing liquid from the lower plate of an intermediate group of at least two successive plates and recirculating said liquid to the upper plate of said intermediate group, maintaining said recirculating liquid alkaline and at a pH different from the said body of liquid in said still zone by a pH value of at least 2 to aid in retaining volatile radioactive substances passing up through said intermediate group of plates in contact with said liquid of a different pH on said plates, and releasing purified vapor free of volatile radioactive substances from the top of said column.

2. Method according to claim 1, wherein reflux condensate on a plate above said intermediate group of plates is withdrawn from said column and introduced into said column at a point below said intermediate group of plates.

3. Method according to claim 2, wherein a portion of said withdrawn reflux condensate in an amount of less than 10% is diverted and directed as reflux to the intermediate group of plates.

4. Method according to claim 1, wherein said recirculating liquid is introduced into said column in the form of a spray flowing downward countercurrent to the upward flow of vapors and volatile radioactive substances.

5. Method according to claim 1, wherein an added substance is introduced into the recirculating liquid to obtain and maintain the desired pH of the recirculating liquid.

6. Method according to claim 5, wherein said added substance is an alkaline material.

7. Method according to claim 6, wherein said alkaline material is sodium hydroxide.

8. Method according to claim 1, wherein said liquid in the still zone contains boric acid.

9. Method according to claim 2, wherein a small amount of less than about 10% is bled from said recirculating liquid to prevent build-up of volatile radioactive substances in the recirculating liquid and in the column.

10. Method according to claim 9, wherein said bleed is substantially equal in amount to said reflux condensate directed to said intermediate group of plates.

11. Method according to claim 1, wherein said heating of said liquid to generate vapors and volatilize radioactive substances is effected by flowing said liquid in said still zone through a heat exchanger, and the thus heated liquid from the heat exchanger returned to the still zone.

12. Method according to claim 11, wherein a portion of said flowing stream is discharged from the system.

13. Method according to claim 1, wherein said vapor released from the top of said column is cooled and condensed and a portion of said vapor condensate returned to the top of said column, and the remainder of said vapor condensate recovered as distillate product.

14. Method according to claim 13, wherein contaminated liquid is continuously fed into said still zone, and wherein said portion of the flowing stream from the still zone is continuously discharged, and wherein said recirculating liquid is continuously bled, and wherein said distillate product is continuously recovered, and wherein the amount of feed per unit time of said contaminated liquid is substantially equal to the sum of the amounts of discharge from said flowing stream, said recirculating liquid and said distillate product in the same unit time.

* * * * *